US012595018B2

(12) United States Patent
McPheeters

(10) Patent No.: US 12,595,018 B2
(45) Date of Patent: Apr. 7, 2026

(54) CART/TRAILER

(71) Applicant: Moved By Bikes LLC, Santa Cruz, CA (US)

(72) Inventor: Greg McPheeters, Santa Cruz, CA (US)

(73) Assignee: Moved By Bikes LLC, Santa Cruz, CA (US)

( * ) Notice: Subject to any disclaimer, the term of this patent is extended or adjusted under 35 U.S.C. 154(b) by 598 days.

(21) Appl. No.: 18/094,955

(22) Filed: Jan. 9, 2023

(65) Prior Publication Data

US 2023/0219387 A1 Jul. 13, 2023

Related U.S. Application Data

(60) Provisional application No. 63/356,796, filed on Jun. 29, 2022, provisional application No. 63/297,470, filed on Jan. 7, 2022.

(51) Int. Cl.
| | |
|---|---|
| B62K 27/00 | (2006.01) |
| B60D 1/155 | (2006.01) |
| B60D 1/00 | (2006.01) |

(52) U.S. Cl.
CPC ............ B62K 27/003 (2013.01); B60D 1/155 (2013.01); *B60D 2001/003* (2013.01)

(58) Field of Classification Search
CPC .. B62K 27/003; B60D 2001/003; B62B 1/12; B62B 1/125; B62B 1/206
See application file for complete search history.

(56) References Cited

U.S. PATENT DOCUMENTS

| | | | | | |
|---|---|---|---|---|---|
| 2,725,242 | A | * | 11/1955 | Peplin | ................... B62K 27/12 |
| | | | | | 280/415.1 |
| 3,877,723 | A | * | 4/1975 | Fahey | ....................... B62B 1/18 |
| | | | | | 280/492 |
| 4,037,853 | A | * | 7/1977 | Sparks | ....................... B62J 7/04 |
| | | | | | 280/204 |

(Continued)

FOREIGN PATENT DOCUMENTS

| | | | | |
|---|---|---|---|---|
| DE | 102019135039 A1 | * | 6/2021 | .............. B62B 1/12 |
| DE | 202022002117 U1 | * | 12/2022 | ............. B62K 27/12 |

(Continued)

*Primary Examiner* — Kevin Hurley
(74) *Attorney, Agent, or Firm* — Herbert Smith Freehills Kramer (US) LLP

(57) ABSTRACT

A cart/trailer, yoke mechanism, and hitch mechanism are disclosed. The cart/trailer could be an assembly for moving and transporting objects comprising a tow bar (synonymous herein with a handle or kickstand); a variable-positioning yoke assembly for facilitating the placement of the tow bar into positions of a towbar, handle, or kickstand; and a main structure within which equipment such as sporting accessories may be placed for transport for moving and transporting objects. The coupling device could include a main body with an inner surface, and a pair of opposing flanges extending downwardly and substantially perpendicularly away from the main body for facilitating the positioning of the yoke in variable positions. The hitch mechanism could include a hitch and interface with receiver and hitch portions for facilitating the hitching of the cart/trailer to a mobility device.

19 Claims, 18 Drawing Sheets

20

Tow Bar

(56) References Cited

U.S. PATENT DOCUMENTS

| | | | | |
|---|---|---|---|---|
| 5,020,813 | A * | 6/1991 | Gottschalk | B62K 27/14 |
| | | | | 280/483 |
| 8,091,908 | B2 * | 1/2012 | Wilson | B62K 27/12 |
| | | | | 280/204 |
| 9,242,694 | B2 * | 1/2016 | Foley | B62K 27/003 |
| 9,481,417 | B2 * | 11/2016 | Holland | B60P 3/105 |
| 11,046,385 | B1 * | 6/2021 | Anderegg | B62K 27/003 |
| 11,648,970 | B2 * | 5/2023 | Gibson | B62B 1/12 |
| | | | | 280/47.18 |
| 2012/0313345 | A1 * | 12/2012 | Kamler | B62K 27/003 |
| | | | | 280/292 |

FOREIGN PATENT DOCUMENTS

| | | | | | |
|---|---|---|---|---|---|
| GB | 2374323 | A | * | 10/2002 | B62K 27/003 |
| JP | 2014058180 | A | * | 4/2014 | B62K 27/003 |
| WO | WO-2025021806 | A1 | * | 1/2025 | B62B 1/008 |

* cited by examiner

Tow Bar

10

20

Tow Bar

FWD

CART/TRAILER

TECHNICAL FIELD

The present invention relates generally to carts and trailers, more particularly, an assembly for moving and transporting objects.

BACKGROUND OF THE DISCLOSURE

As bicycling continues to grow in popularity and as a viable, means of transportation, it is increasingly useful to have cost effective means of using standard bicycles to accomplish everyday tasks. Typical bicycles require the rider to keep both hands on the handle bars to safely steer the mobility device from destination to destination. It is, therefore, dangerous or impossible for the rider to hold or carry objects while riding. Some bicycles are equipped with storage racks or baskets for safely holding small objects. However, there are many objects for which these current storage systems are woefully inadequate.

SUMMARY OF THE DISCLOSURE

Embodiments of the inventive concepts disclosed herein are directed to an assembly for moving and transporting objects, a coupling device, and a hitching device.

In one aspect, embodiments of the inventive concepts disclosed herein are directed to combination of a cart and trailer including a tow bar, a variable-positioning yoke, and an assembly for moving and transporting objects. The variable-positioning yoke is coupled to the tow bar, and the assembly is coupled to the yoke for enabling the assembly to be placed into one of a plurality of configurations In a further aspect, embodiments of the inventive concepts disclosed herein are directed to a coupling device having a main body with an inner surface and a left flange and an opposing right flange extend downwardly and substantially perpendicularly away from the main body and from which the coupling device is defined.

In a further aspect, embodiments of the inventive concepts disclosed herein are directed to a hitching device and an interface with a receiver portion and a hitch portion, where hitch portion has a pair of flanges which include apertures from which clamping members pivot and pins facilitating the functionality of the clamping members are defined.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
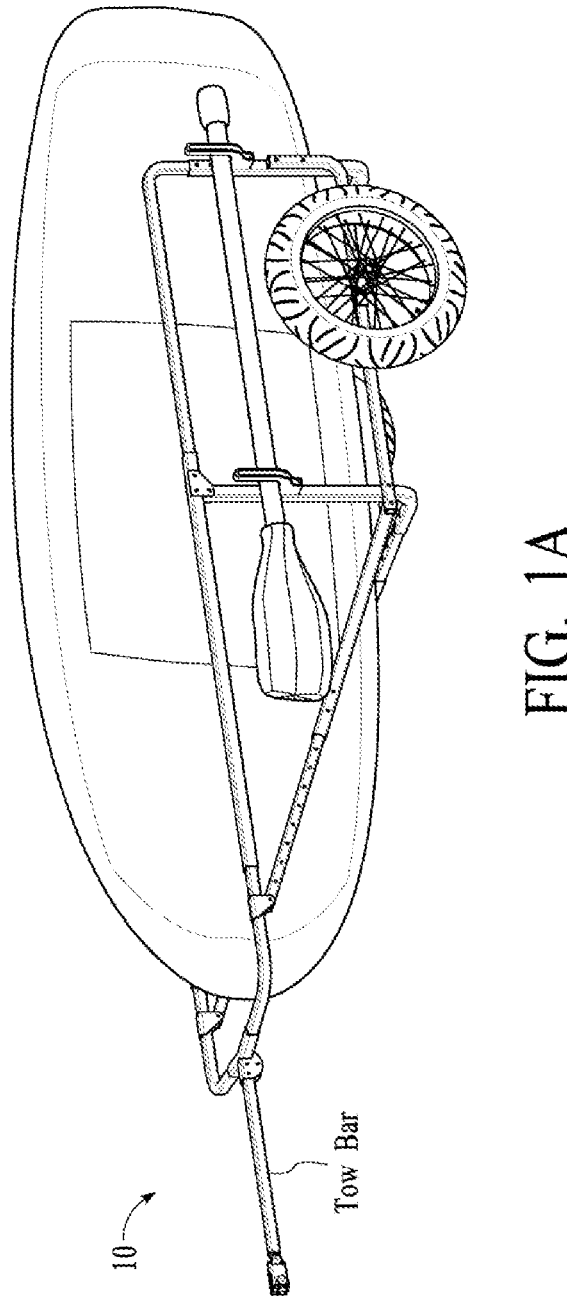
FIGS. 1A through 1B, inclusive, illustrate a mobility device configured as a trailer and cart, respectively, in accordance with some embodiments.
Figure 1B:
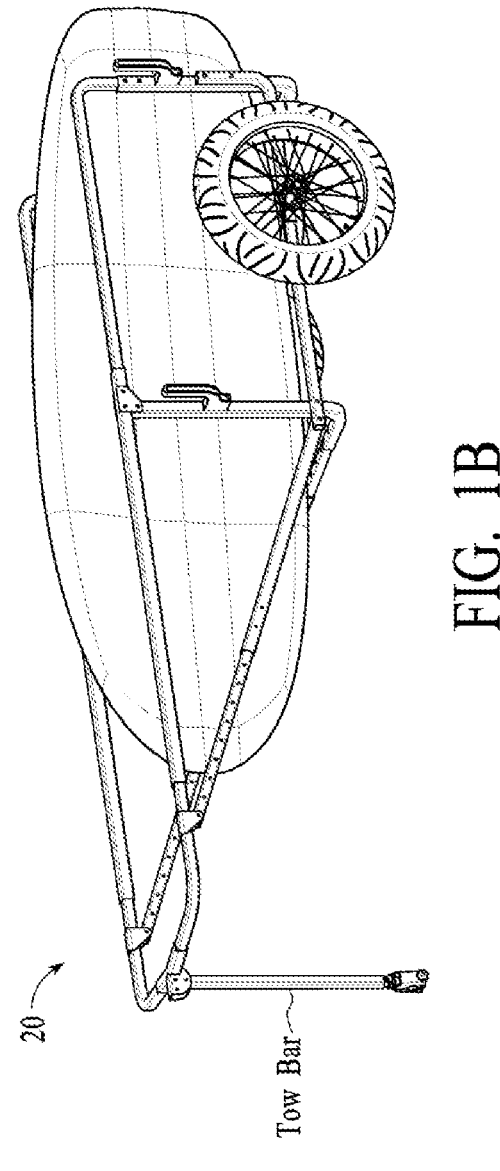

Referring to FIGS. 1A and 1B, embodiments of a mobility device configured as a trailer 10 and a cart 20 are shown. In FIG. 1A, a mobility device is illustrated as a trailer that is ready to haul equipment from one point to another by hitching the end of the structural member (labeled here as "tow bar") to a mobility device such as, but not limited to, a bicycle. In FIG. 1B, the mobility device is illustrated as a cart in which the "tow bar" is serving as a "handle" from which a user may steer the mobility device as a cart while pushing it or pulling it while the tow bar remains substantially vertical. When not being utilized, the "tow bar" can be used as a "kickstand" on which the mobility device rests when not in use.

Figure 2A:
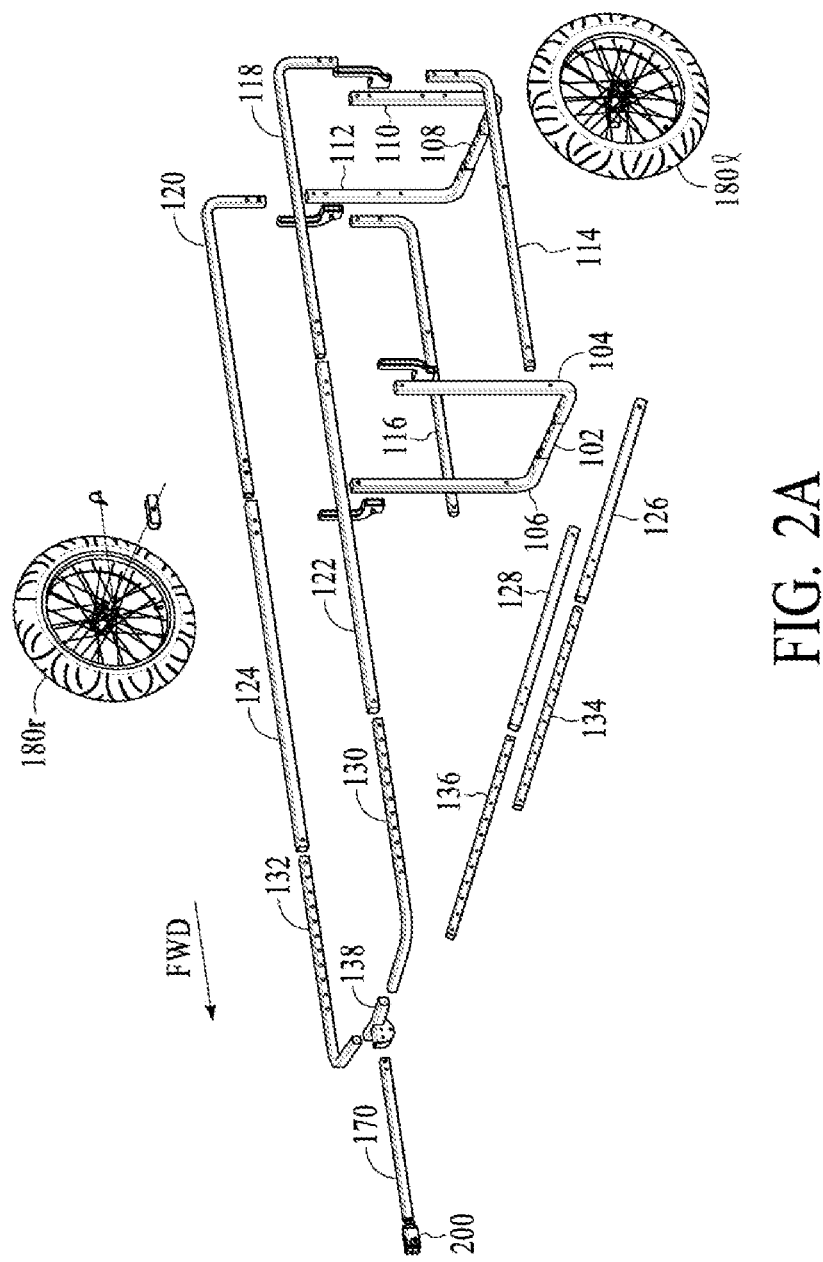
FIG. 2A illustrates an exploded view of structural members of a frame of the mobility device, in accordance with some embodiments.

Referring to FIG. 2A, an exploded view of trailer 10 of FIG. 1A is presented.

Figure 2B:
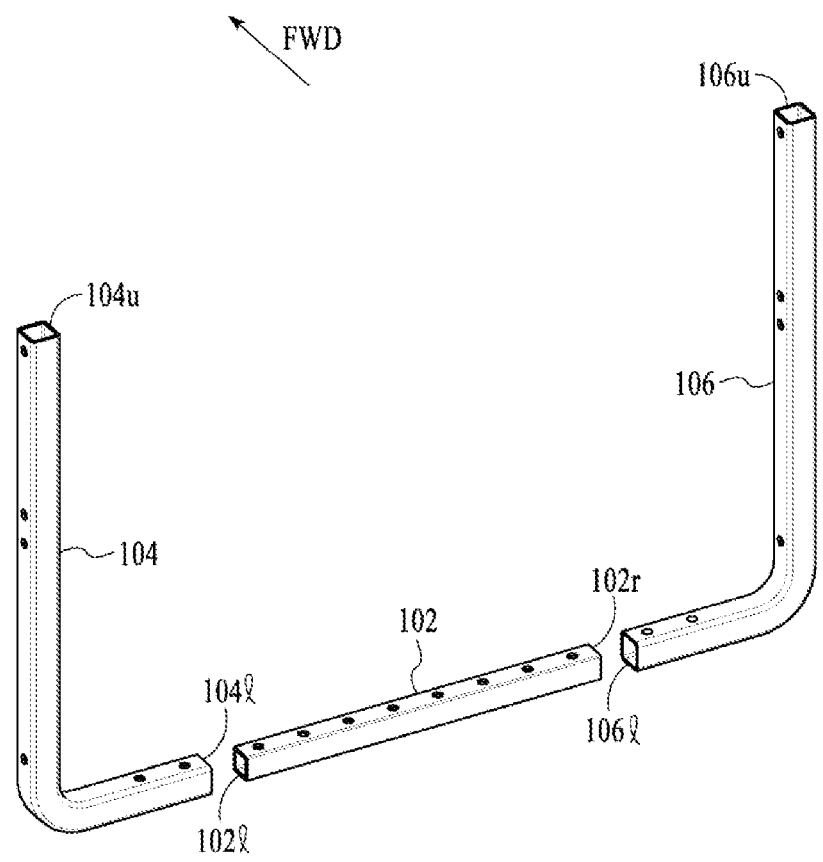
FIGS. 2B through 2H, inclusive, illustrate structural members of the frame, in accordance with some embodiments.

Referring to FIG. 2B, frame includes 100 includes a forward horizontal member 102 with opposing left and right ends 102*l* and 102*r*, respectively; a left, forward vertical L-shape member 104 with opposing upper and lower ends 104*u* and 104*l*, respectively; and right, forward vertical L-shape member 106 with opposing upper and lower ends 106*u* and 106*l*, respectively. Left end 102*l* may be coupled to lower end 104*l*, and right end 102*r* may be coupled to lower end 106*l*. In some embodiments, member 102 may be configured for a slidable engagement with members 104 and 106, where ends 102*l* and 102*r* slide inside of ends 104*l* and 106*l*, respectively, when coupling the members together. As observed, there are a plurality of fastening holes of member 102 to enable a user to adjust the width of frame 100 of mobility device 10.

Figure 2C:
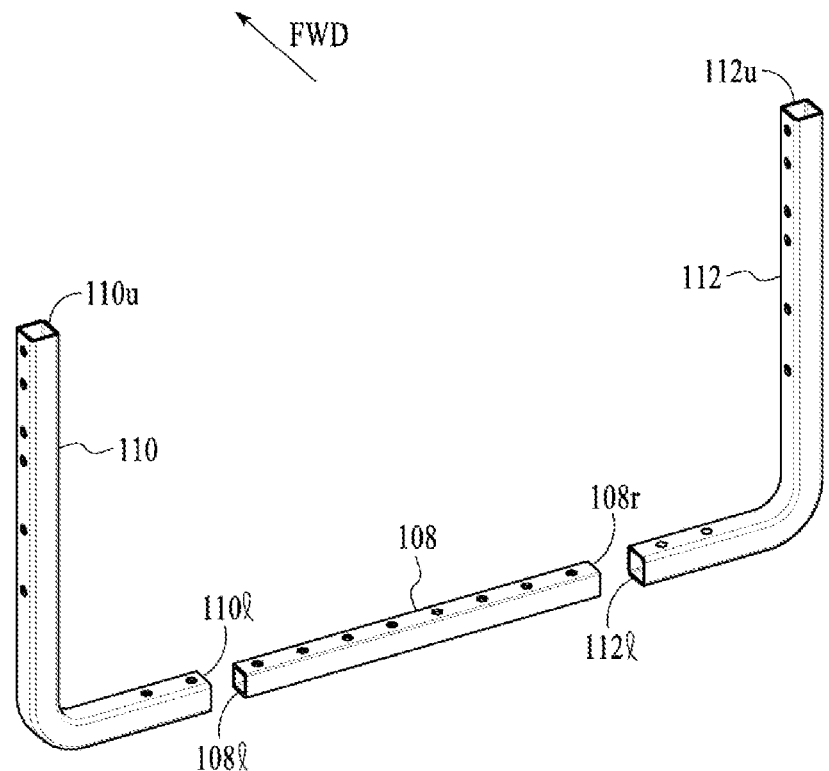

Referring to FIG. 2C, frame includes 100 includes an aft horizontal member 108 with opposing left and right ends 108*l* and 108*r*, respectively; a left, forward vertical L-shape member 110 with opposing upper and lower ends 110*u* and 110*l*, respectively; and right, forward vertical L-shape member 112 with opposing upper and lower ends 112*u* and 112*l*, respectively. Left end 108*l* may be coupled to lower end 110*l*, and right end 108*r* may be coupled to lower end 112*l*. In some embodiments, member 108 may be configured for a slidable engagement with members 110 and 112, where ends 108*l* and 108*r* slide inside of ends 110*l* and 112*l*, respectively, when coupling the members together. As observed, there are a plurality of fastening holes of member 108 to enable a user to adjust the width of frame 100 of mobility device 10.

Figure 2D:
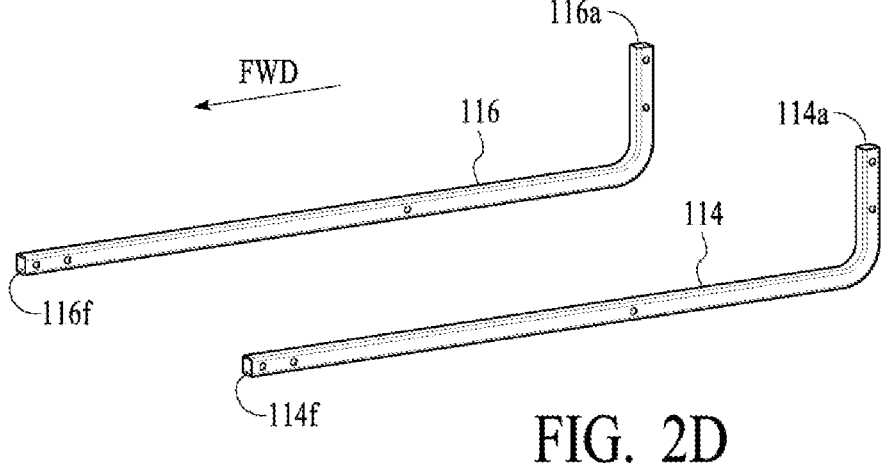

Referring to FIG. 2D, frame 100 includes a left, lower vertical L-shaped member 114 with opposing forward and aft ends 114*f* and 114*a*, respectively. As shown in FIGS. 2A and 2D, forward end 114*f* may be coupled to member 104, and aft end 114*a* may be coupled to member 110.

Also, frame 100 includes a right, lower vertical L-shape member 116 with opposing forward and aft ends 116*f* and 116*a*, respectively. Forward end 116*f* may be coupled to member 106 that is shown in FIG. 2B, and aft end 116*a* may be coupled to member 112 that is shown in FIG. 2C.

Figure 2E:
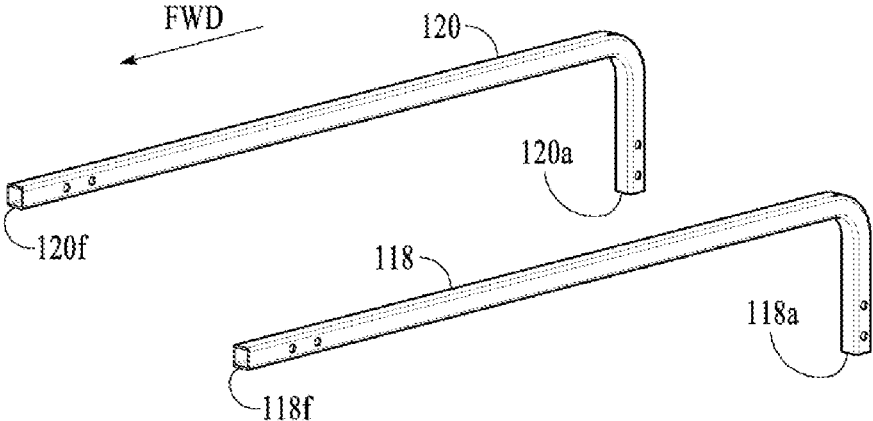

Referring to FIG. 2E, frame 100 includes a left, upper vertical L-shape member 118 with opposing forward and aft ends 118*f* and 118*a*, respectively. Forward end 118*f* may be coupled to end 104*u* that is shown in FIG. 2B, and end 118*a* may be coupled to member 110 that is shown in FIG. 2C.

Also, frame 100 includes a right, upper vertical L-shape member 120 with opposing forward and aft ends 120*f* and 120*a*, respectively. Forward end 120*f* may be coupled to end 106 that is shown in FIG. 2B, and end 120*a* may be coupled to member 112 that is shown in FIG. 2C.

Figure 2F:
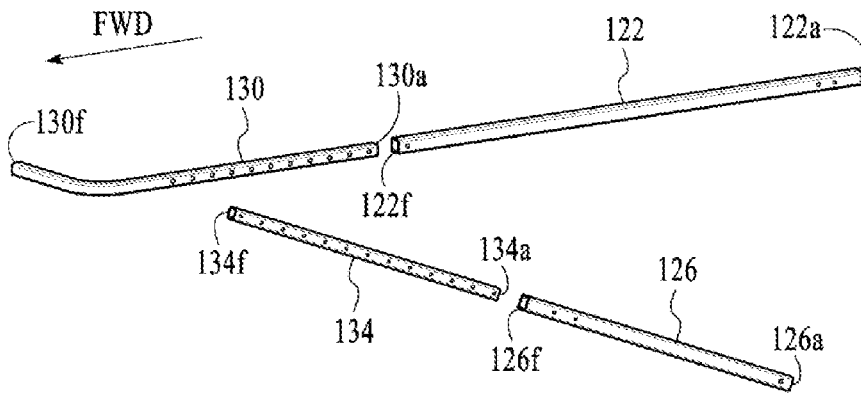

Referring to FIG. 2F, frame 100 includes a left, upper horizontal member 122 with opposing forward and aft ends 122*f* and 122*a*, respectively. Aft end 122*a* may be coupled to ends 104*u* and 118*f* that are shown in FIGS. 2B and 2E, respectively.

Figure 2G:
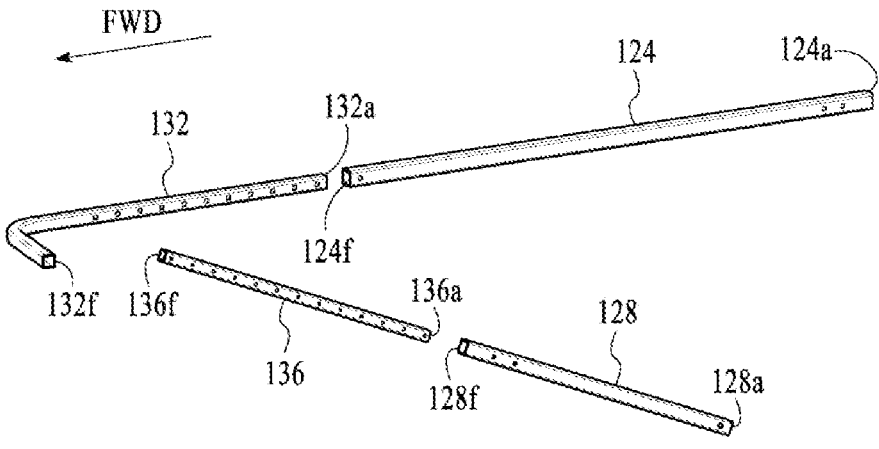

Referring to FIG. 2G, frame 100 includes a right, upper horizontal member 124 with opposing forward and aft ends 124*f* and 124*a*, respectively. Aft end 124*a* may be coupled to ends 106*u* and 120*f* that are shown in 2B and 2E, respectively.

Returning to FIG. 2F, frame 100 includes a left diagonal member 126 with opposing forward and aft ends 126*f* and 126*a*, respectively. Aft end 126*a* may be coupled to both end 114*f* and member 104 that are shown in 2D and 2B, respectively.

Returning to FIG. 2G, frame 100 includes a right diagonal member 128 with opposing forward and aft ends 128*f* and 128*a*, respectively. Aft end 128*a* may be coupled to both end 116*f* and member 106 that are shown in 2D and 2B, respectively.

Figure 2H:
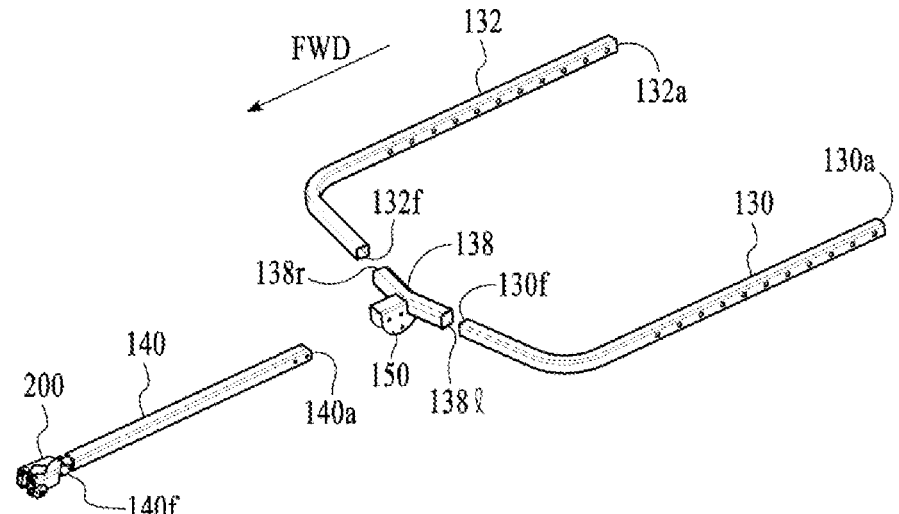

Referring to FIG. 2H, frame 100 includes a horizontal L-shape member 130 with opposing forward and aft ends 130*f* and 130*a*, respectively. Aft end 130*a* may be received at forward end 122*f* of FIG. 2F to facilitate a slideable engagement between members 130 and 122, respectively.

Frame 100 includes a horizontal L-shape member 132 with opposing forward and aft ends 132*f* and 132*a*, respectively. Aft end 132*a* may be received at forward end 124*f* of FIG. 2F to facilitate a slideable engagement between members 132 and 124, respectively.

Returning to FIG. 2F, frame 100 includes a left diagonal member 134 with opposing forward and aft ends 134*f* and 134*a*, respectively. Forward end 134*f* may be coupled to member 130 with a bracket. Also, aft end 134*a* may be received at forward end 126*f* to facilitate a slidable engagement between member 134 and member 126.

Returning to FIG. 2G, frame 100 includes a right diagonal member 136 with opposing forward and aft ends 136*f* and 136*a*, respectively. Forward end 136*f* may be coupled to member 132 with a bracket. Also, aft end 136*a* may be received at forward end 128*f* to facilitate a slidable engagement between members 136 and 128, respectively.

Returning to FIG. 2H, frame 100 couples to variable-positioning yoke 150 having a joining member 138 with opposing left and right ends 138*l* and 138*r*, respectively. Left end 138*l* may be coupled to forward end 130*f*, and right end 138*r* may be coupled to forward end 134*f*.

Frame 100 includes a tow bar 140 with opposing forward and aft ends 140*f* and 140*a*, respectively. Aft end 140*a* may be coupled to a variable-positioning yoke 150 and forward end 140*f* may be coupled to hitch 200.

Figure 2I:
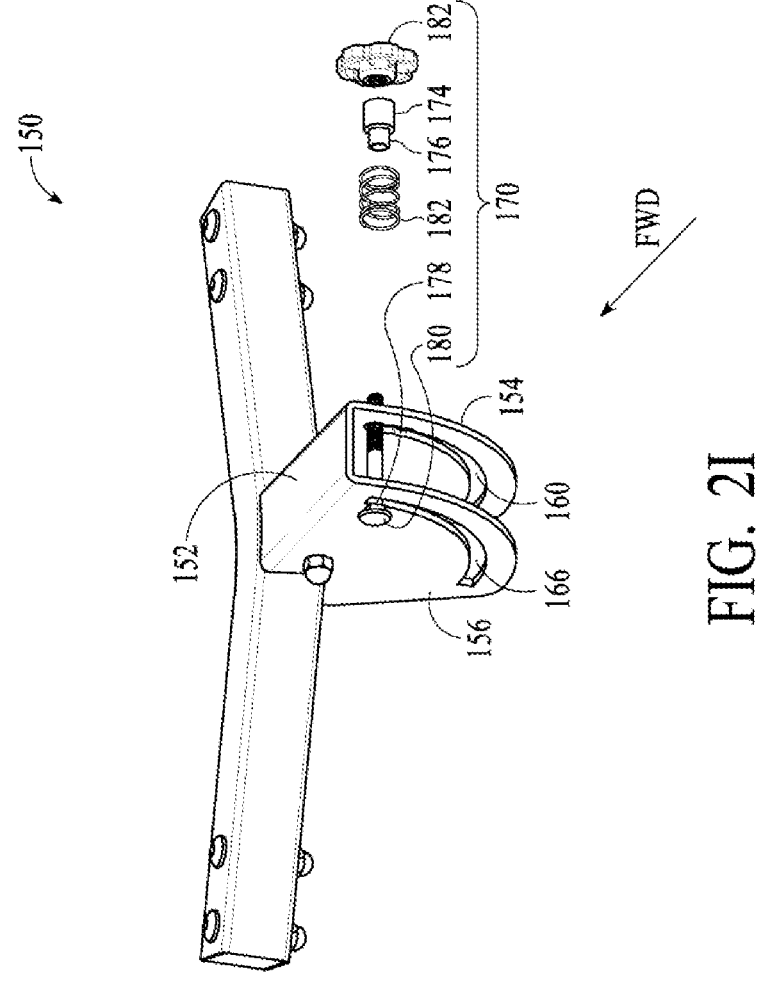
FIGS. 2I through 2J, inclusive, illustrate a variable-positioning yoke, in accordance with some embodiments.
Figure 2J:
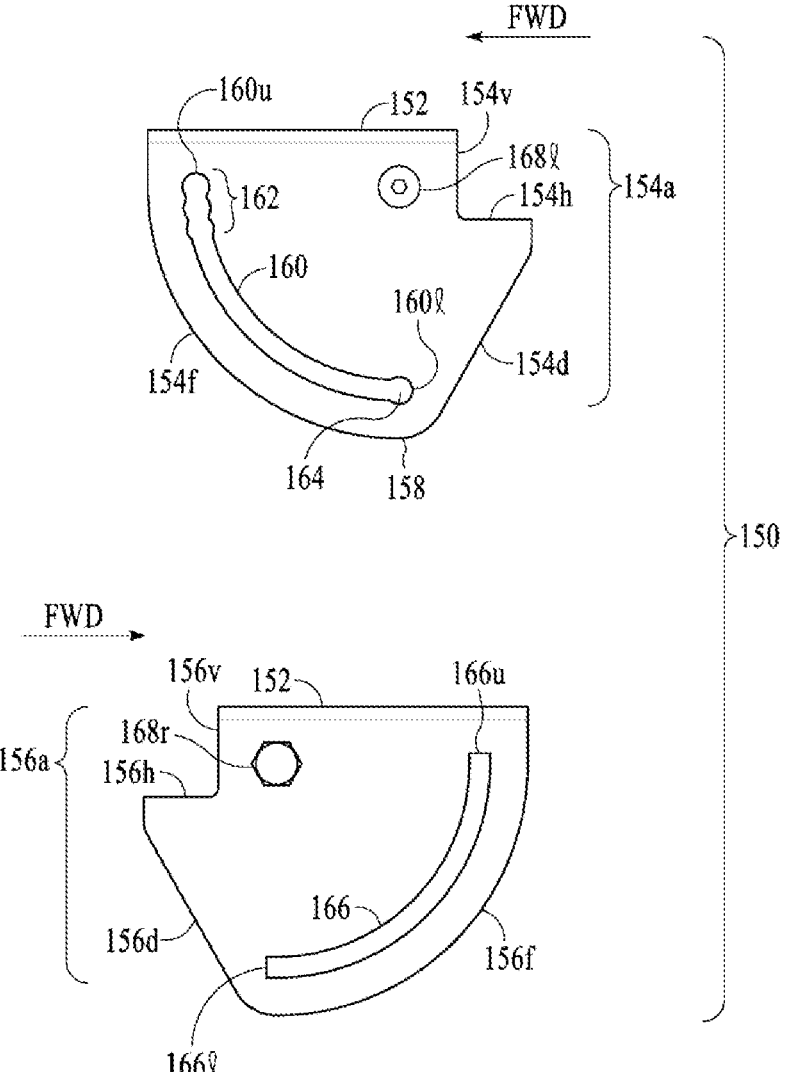

Referring to FIGS. 2I and 2J, variable-positioning yoke 150 includes a main body 152 with opposing left and right flanges 154 and 156, respectively, extending substantially parallel to each other and substantially away from main body 152. Aft side 154*a* of flange 154 includes side 154*v* extending vertically downward from main body 152, side 154*h* extending horizontally away from side 154*v*, and side 154*d* extending angularly downward and away from side 154*h* until reaching an intersection surface 158. Flange 154 includes forward side 154*f* extending downward and curving aft until reaching intersection surface 156; for the purpose of illustration and not of limitation, forward side 154*f* is illustrated as following a curved path.

Flange 154 includes a curved slot 160 with opposing upper and lower ends 160*u* and 160*l*, respectively, which could each include one or more apertures; as shown, upper end 160*u* has three apertures 162, and lower end 160*l* has one aperture 164. As observed, the widths of apertures 162 and 164 are greater than the width of curved slot 160. Here, apertures facilitate a positioning of tow bar 140 into more than one position or configuration such as the "travel" and "resting" positions of FIGS. 1A and 1B, respectively.

Similar to flange 154, aft side 156*a* of flange 156 includes side 156*v* extending vertically downward from main body 152, side 156*h* extending horizontally away from aide 156*v*, and side 156*d* extending angularly downward and away from side 156*h* until reaching an intersection surface 158. Flange 156 includes forward side 156*f* extending downward and curving aft until reaching intersection surface 156; for the purpose of illustration and not of limitation, forward side 156*f* is illustrated as following a curved path. Flange 156 includes a curved slot 166 with opposing upper and lower ends 166*u* and 166*l*.

Positioning pin 170 includes a knob 172, shank portions 174 and 178, a slot engagement member 180, an end cap 180, and a spring 184. As shown, shank portion 174 has the greatest diameter and is configured to fit within one of the apertures 162 and 164 to lock but not fit into slot 160. Diameter of shank portion 176 may be the same as the width of slot 160. When a user pulls out pin 170, this will move shank portion 176 towards the slot as the user experiences resistance from spring 184. When shark position 176 moves into slot 160, this will release shank portion 174 from one of the apertures while permitting slidable movement between 176 and slot 160, thereby allowing a user to angularly move tow bar 140 and slide positioning pin 170 within slot 160 until a new angular position has been reached at which shank portion 174 may be placed into one of the apertures 162 and 164.

Figure 3A:
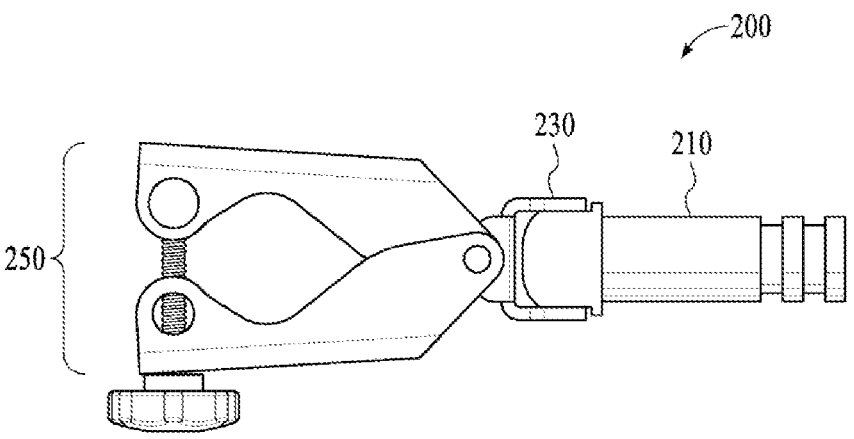
FIGS. 3A through 3C, inclusive, a hitching device 200, in accordance with some embodiments.
Figure 3B:
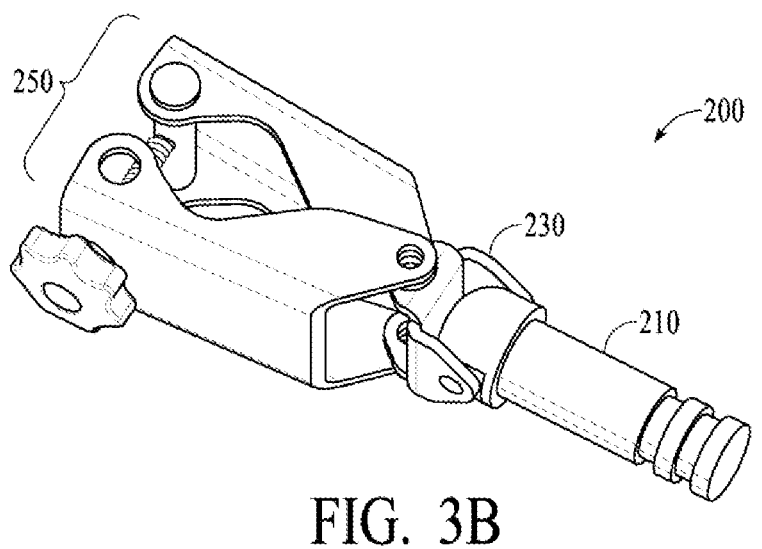
Figure 3C:
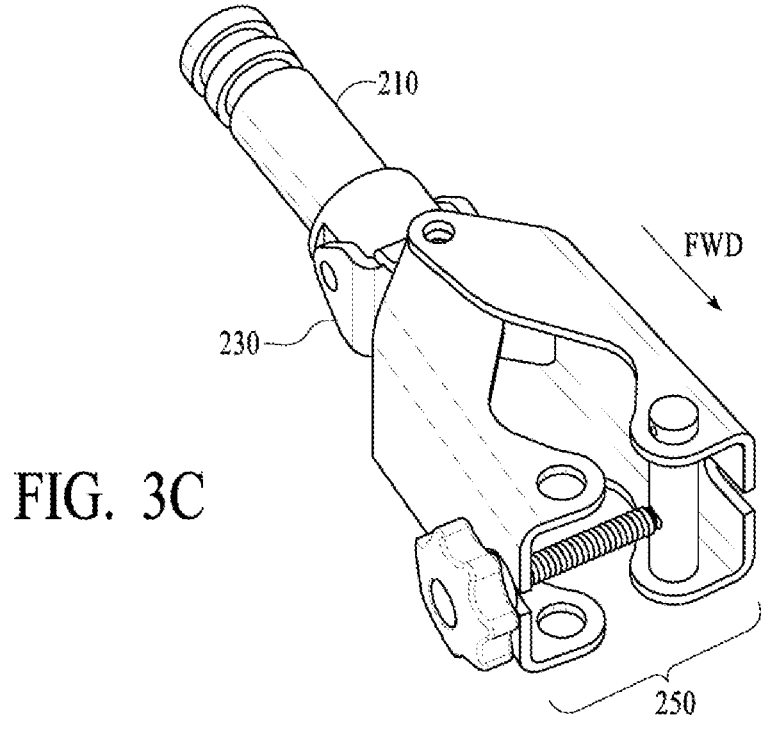

Referring now to FIGS. 3A through 3C, inclusive, a hitching device 200 with a hitch receiver 210, an interface 230, and hitch 250 is illustrated in three different views.

Figure 3D:
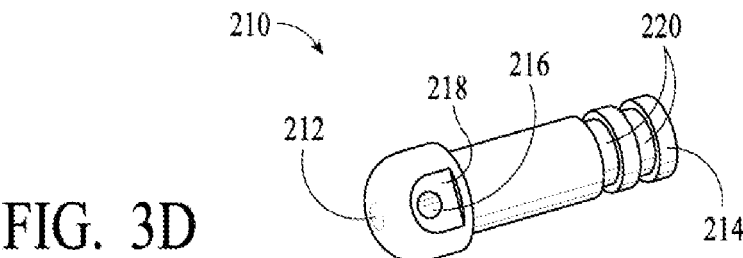
FIG. 3D illustrates a hitch receiver, in accordance with some embodiments.

Referring now to FIG. 3D, hitch receiver 210 has a proximal end 212, distal end 214, an aperture 216, a flattened surface 218 for engaging inner surfaces of flange 230, and a plurality of grooves 220. As embodied herein, hitch receiver 210 may be configured for coupling to tow bar 140.

Returning to FIG. 2H, frame 100 includes a tow bar 140 with opposing forward and aft ends 140*f* and 140*a*, respectively. Aft end 140*a* may be coupled to a variable-positioning yoke 150, and forward end 140*f* may be coupled to hitch 210.

Figure 3E:
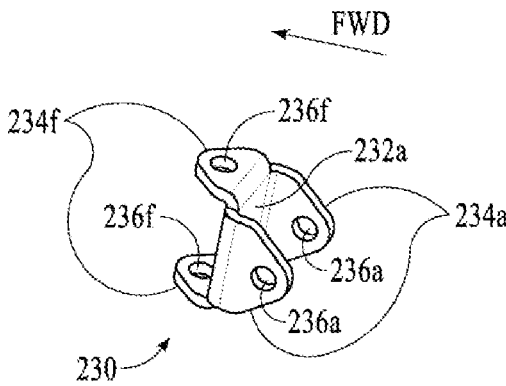
FIGS. 3E and 3F, inclusive, illustrate an interface, in accordance with some embodiments.
Figure 3F:
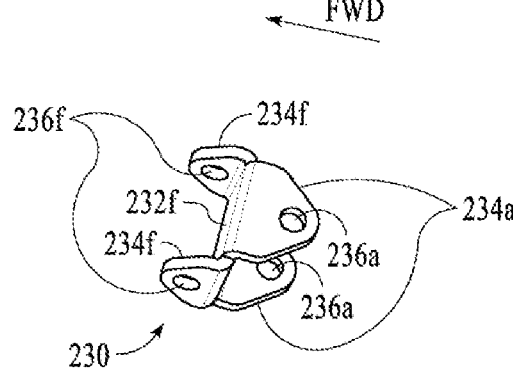

Referring now to FIGS. 3E and 3F, interface 230 includes a pair of opposing flanges 234*f* extend outwardly away from forward surface 232*f* in the same direction, substantially perpendicular to forward surface 232*a*, and in the opposite direction of flanges 234*a*. Each of the opposing flanges 234*f* include an aperture 236*f* concentrically aligned with the other through which a fastening device 254 may be inserted through apertures 254l and 254*r* (shown in FIG. 3H) for coupling hitch 250 to interface 230.

Figure 3G:
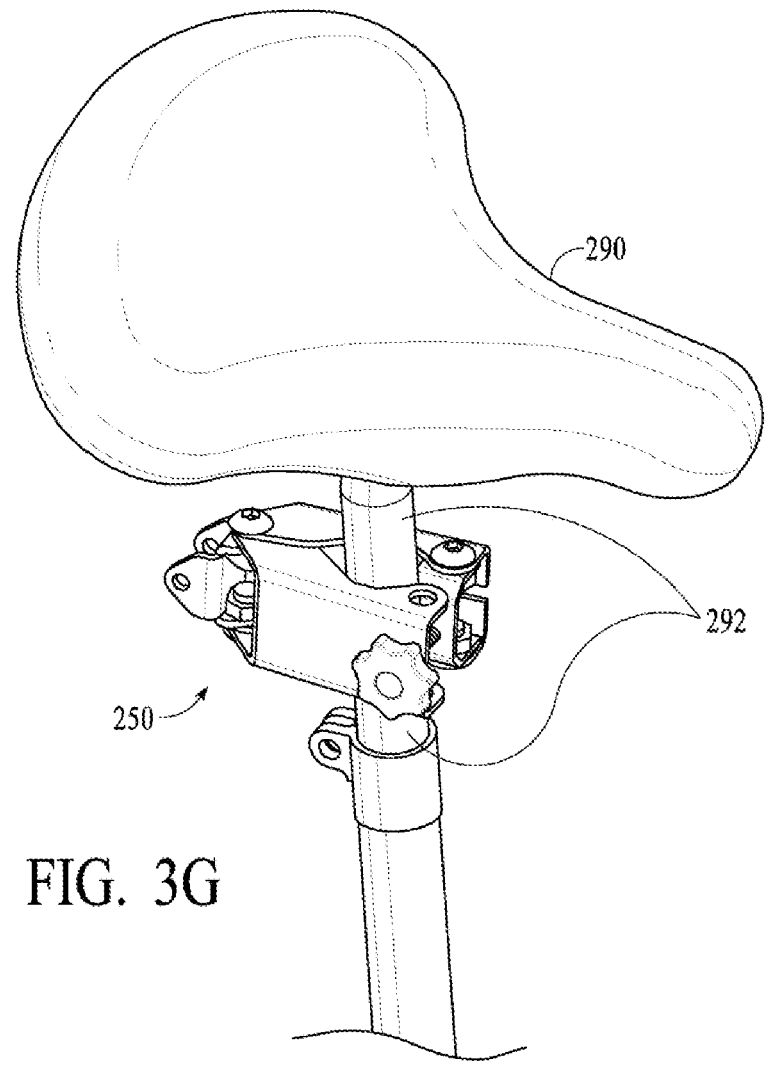
FIG. 3G illustrates an employment of a hitch, in accordance with some embodiments.

Referring now to FIG. 3G, an exemplary employment of hitch 250 coupled to a yoke 292 of a bicycle seat 290.

Figure 3H:
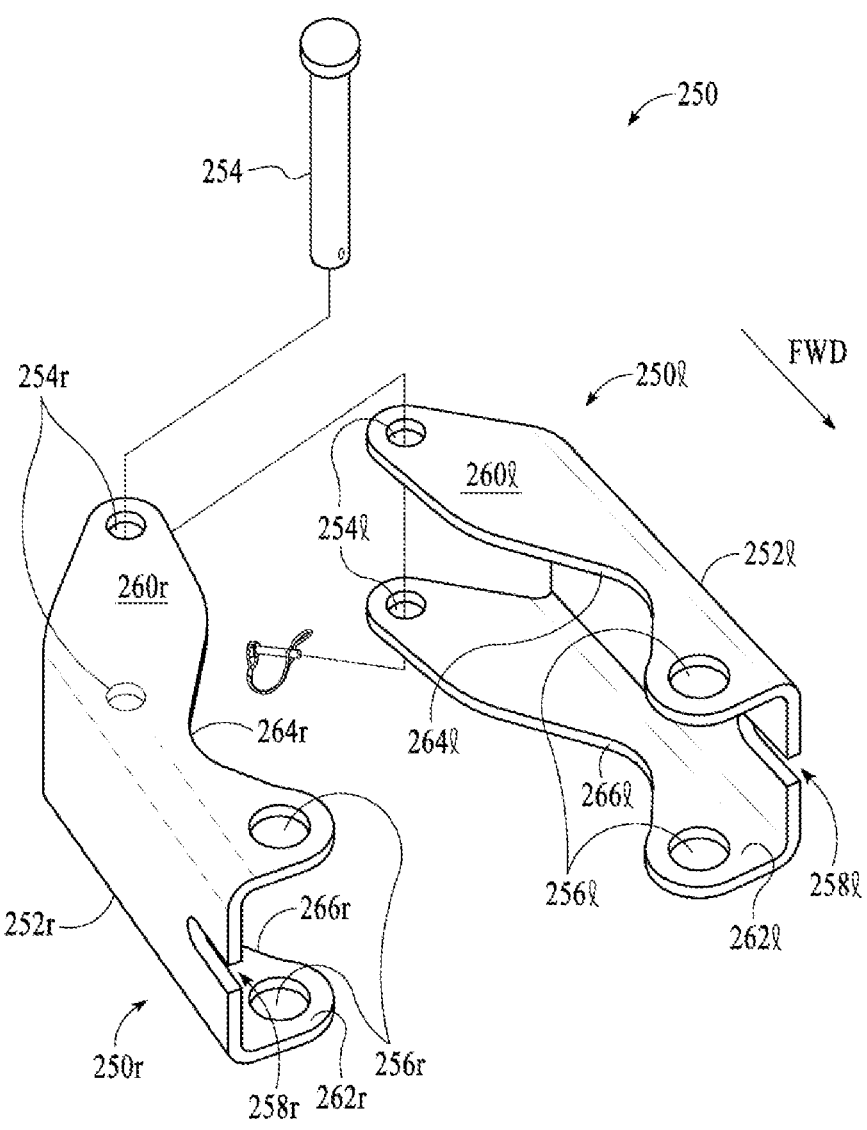
FIG. 3H illustrates a hitch, in accordance with some embodiments.

Referring now to FIG. 3H, hitch 250 includes left clamping member 250*l* and opposing right clamping member 250*r*. Left clamping member 250*l* includes a main body 252*l*, concentrically aligned apertures 254*l* at its proximal end, concentrically aligned apertures 256*l* at its distal end, upper and lower flanges 260*l* and 262*l*, respectively, extending away from main body 252*l*, curved clamp engagement surfaces 264*l* and 266*l*, and a slot 258*l*.

Similarly, right clamping member 250*r* has opposing members of left clamping member 250*l* and includes a main body 252*r*, concentrically aligned apertures 254*r* at its proximal end, concentrically aligned apertures 256*r* at its distal end, and upper and lower flanges 260*r* and 262*r*, respectively, extending away from main body 252*r*, curved clamp engagement surfaces 264*r* and 266*r*, and a slot 258*r*. When hitch 250 is employed as a hitch, curved clamp engagement surfaces 264*l* and 266*l* and curved clamp engagement surfaces 264*r* and 266*r* engage the member to which the hitch is mounted such as, for the purpose of illustration and not of limitation, these surfaces engaging yoke 292 of bicycle seat shown in FIG. 3G.

Figure 3I:
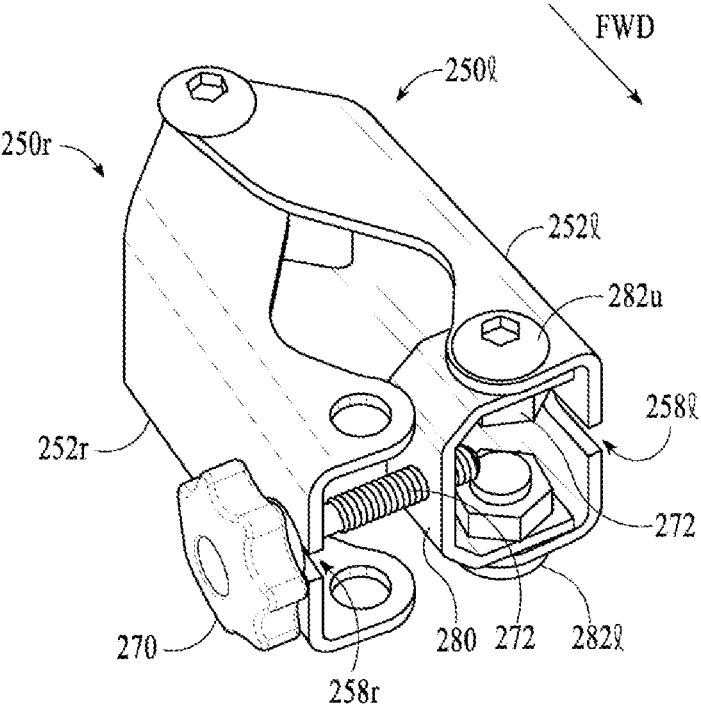
FIG. 3I illustrates a first embodiment of hardware which facilitates an opening and closing of a hitch, in accordance with some embodiments.

Referring now to FIG. 3I, a first embodiment of hardware which facilitates an opening and closing of hitch 250 is illustrated. As shown, a knurled knob 270 with a threaded shank 272 has been inserted through slot 258*r* to engage a threaded aperture of adapter 280 which is secured to upper and lower inner surfaces of left clamping member 250*l* with upper and lower fasteners 282*u* and 282*l*, respectively, extending through pair of apertures 256*l*.

Figure 3J:
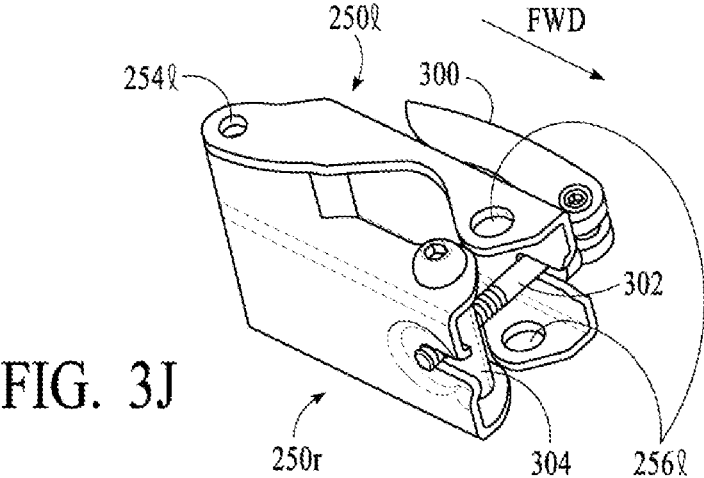
FIGS. 3J and 3K illustrate a second embodiment of hardware which facilitates an opening and closing of a hitch, in accordance with some embodiments.
Figure 3K:
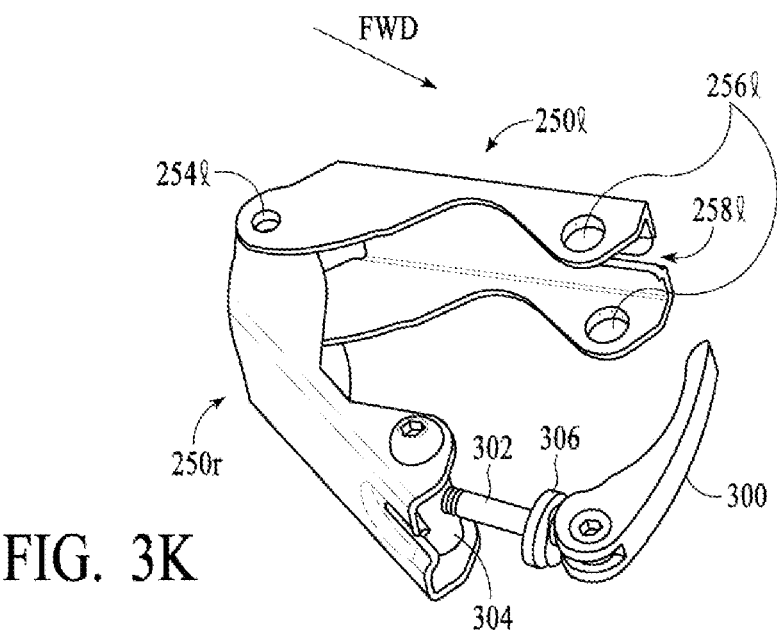

Referring now to FIGS. 3J and 3K, a second embodiment of hardware which facilitates an opening and closing of hitch 250 is illustrated. As shown, a clamping handle 300 with a threaded shank 302 has threadably engaged threads of a pin 304 extending through pair of apertures 256*r* of right clamping member 250*r*. As shown, washer 306 has been inserted over threaded shank 302. When hinge 250 is employed, curved clamp engagement surfaces 264*l* and 266*l* and curved clamp engagement surfaces 264*r* and 266*r* will engage the member to which hinge 250 is secured, threaded shank 302 will be inserted into slot 258*l*, and washer 306 will be sandwich in between clamping handle 300 and left clamping member 250*l*.

Figure 3L:
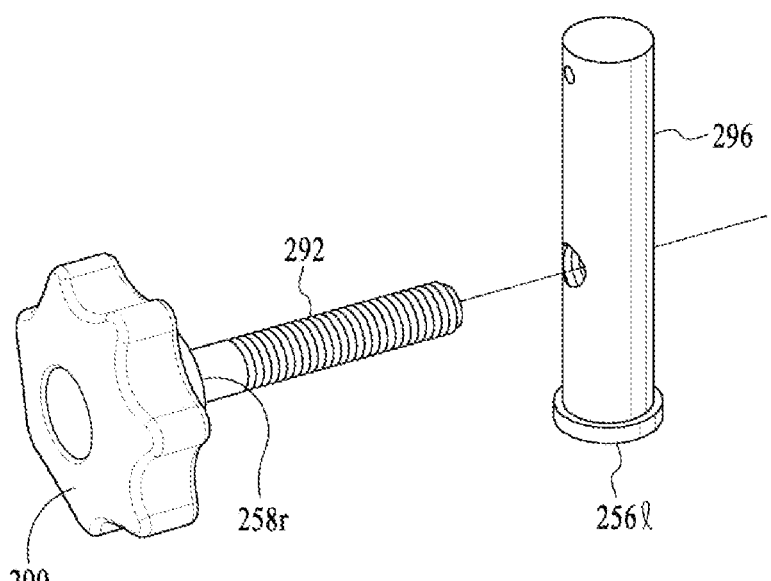
FIG. 3L illustrates a third embodiment of hardware which facilitates an opening and closing of a hitch, in accordance with some embodiments.

Referring now to FIG. 3L, a third embodiment of hardware which facilitates an opening and closing of hitch 250 is illustrated. As shown, a knurled knob 290 with a threaded shank 292 has been inserted through slot 258*r* to threadably engaged threads of a pin 296 extending through pair of apertures 256*l* of right clamping member 250*r*. When hinge 250 is employed, the curved clamp engagement surfaces 264*l* and 266*l* and curved clamp engagement surfaces 264*r* and 266*r* engage the member to which hinge 250 is secured.

As used herein, the term "embodiment" means an embodiment that serves to illustrate by way of example but not limitation.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A combined cart and trailer, comprising:
   a tow bar;
   a variable-positioning yoke with a forward end coupled to an aft end of the tow bar; and
   an assembly for moving and transporting objects coupled to an aft end of the variable-positioning yoke, where the variable-positioning yoke facilitates a positioning of the tow bar into one of a plurality of positions, thereby enabling the assembly to be placed into one of a plurality of configurations;
   wherein the assembly is a variable-width assembly with forward and aft horizontal members configured to vary the width of the assembly, where a left, forward L-shaped vertical member and a right, L-shaped vertical member are configured to slide and engage left and right ends of the forward horizontal member, respectively, and a left, aft L-shaped vertical member and a right, L-shaped vertical member are configured to slide and engage left and right ends of the aft horizontal member, respectively.

2. The combined cart and trailer of claim 1, further comprising:
   a hitching device to which a forward end of the tow bar is coupled.

3. The combined cart and trailer of claim 2, further comprising:
   a post of a bicycle seat to which the hitching device is coupled.

4. The combined cart and trailer of claim 1, wherein one of the plurality of positions of the tow bar corresponds to a cart configuration in which the tow bar extends substantially perpendicular to a surface on which wheels of the assembly rests.

5. The combined cart and trailer of claim 1, wherein one of the plurality of positions of the tow bar corresponds to a trailer configuration in which the tow bar extends substantially parallel to a surface on which wheels of the assembly rests.

6. The combined cart and trailer of claim 1, wherein
   the assembly is a variable-length assembly with left and right upper horizontal members and left and right lower diagonal members to vary the length of the assembly, where
   a left, forward L-shaped left horizontal member and a right, forward L-shaped horizontal member are configured to slide and engage forward ends of the left and right upper horizontal members, respectively, and a left, upper diagonal member and a right, upper diagonal member are configured to slide and engage forward ends of the left and right lower diagonal members, respectively.

7. A variable-positioning yoke, comprising:

a main body;

left and right flanges extending downwardly and substantially perpendicularly away from the main body, where each of the left and right flanges are configured with:

an aperture, a forward side extending downwardly until reaching an intersection surface, an aft side having a first side extending downwardly from the main body, a second side extending horizontally away from the first side, and a third side extending downwardly from the second side until reaching the intersection surface, and a curved slot with a width, where the curved slot of the left flange includes a plurality of apertures having greater widths than the width of the curved slot in which they are included; and a joining member with left and right forward surfaces and left and right lower surfaces, where the left and right forward surfaces extend outwardly from the first sides of the left and right flanges, respectively, and the left and right lower surfaces extend outwardly from the second sides of the left and right flanges, respectively.

8. The variable-positioning yoke of claim 7, wherein the left and right flanges are configured to receive an aft end of a tow bar.

9. The variable-positioning yoke of claim 8, wherein a fastening device extending through the apertures of the left and right flanges and the aft end of the tow bar enables a pivotable engagement between the left and right flanges and the tow bar.

10. The variable-positioning yoke of claim 9, wherein the tow bar travels in a curved path as a result of the pivotable engagement.

11. The variable-positioning yoke of claim 8, wherein the tow bar and the curved slots of the left and right flanges are configured to receive a positioning pin to enable travel of the tow bar between the variable positions.

12. The variable-positioning yoke of claim 11, wherein the positioning pin includes a knob, first and second shank portions, a slot engagement member, an end cap, and a spring.

13. The variable-positioning yoke of claim 12, wherein a pulling force exerted to the positioning pin enables the travel of the tow bar between the variable positions, where the first shank portion engages one aperture of the plurality of apertures in an absence of the pulling force, and the second shank portion and the slot engagement member are enabled to travel within the curved slots of the left and right flanges when a the pulling force causes a disengagement of the first shank portion with the one aperture, whereby.

14. A hitching device, comprising:

a left clamping member with a main body, a proximal end, a distal end, and opposing flanges extending inwardly and substantially perpendicular away from the main body of the left clamping member;

a right clamping member with a main body, a proximal end, a distal end, and opposing flanges extending inwardly and substantially perpendicular away from the main body of the left clamping member;

a shank receiver with a threaded aperture located between opposing apertures of the opposing flanges at the distal end of the left clamping member; and a handle with a shank configured travel within a slot at the distal end of the right clamping member; where a pivotable engagement between the left and right clamping members at their respective proximal ends enables relative pivotable travel of the left and right clamping members at their respective distal ends between open and closed positions, whereby a tightening force applied to the handle with the shank positioned within the slot imparts, when threads of the shank are engaged with the threaded aperture, a closure between the left and right clamping members at their respective distal ends.

15. The hitching device of claim 14, wherein opposing ends of the shank receiver are coupled to the distal ends of the left clamping member and the handle is a knurled knob.

16. The hitching device of claim 15, wherein the shank receiver is a pin.

17. The hitching device of claim 14, wherein opposing ends of the shank receiver are coupled to the distal ends of the left clamping member and the handle is a clamping handle.

18. The hitching device of claim 17, wherein the shank receiver is a pin.

19. The hitching device of claim 17, wherein the shank is configured to receive a washer that, when threads of the shank are engaged with the threaded aperture, is positioned between the clamping handle and the right clamping member.

* * * * *